US009957748B2

(12) United States Patent
Alexander et al.

(10) Patent No.: US 9,957,748 B2
(45) Date of Patent: May 1, 2018

(54) SEALING ASSEMBLY

(71) Applicant: GM GLOBAL TECHNOLOGY OPERATIONS LLC, Detroit, MI (US)

(72) Inventors: Paul W. Alexander, Ypsilanti, MI (US); Nilesh D. Mankame, Ann Arbor, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 15/061,569

(22) Filed: Mar. 4, 2016

(65) Prior Publication Data

US 2016/0265271 A1 Sep. 15, 2016

Related U.S. Application Data

(60) Provisional application No. 62/131,685, filed on Mar. 11, 2015.

(51) Int. Cl.

| | |
|---|---|
| ***E06B 3/80*** | (2006.01) |
| ***E06B 7/20*** | (2006.01) |
| ***E06B 9/08*** | (2006.01) |
| ***B60J 10/15*** | (2016.01) |
| ***E06B 9/06*** | (2006.01) |

(52) U.S. Cl.

CPC ................ *E06B 3/80* (2013.01); *B60J 10/15* (2016.02); *E06B 7/20* (2013.01); *E06B 9/0692* (2013.01); *E06B 9/08* (2013.01); *E06B 2007/202* (2013.01)

(58) Field of Classification Search

CPC . B60J 10/244; B60J 10/16; B60J 10/50; B60J 10/15; B60J 10/40; B60J 10/84; B60J 10/14; B60J 10/246; B60J 10/248; E06B 9/08; E06B 9/0692; E06B 3/80; E06B 7/20; E06B 2007/202; C08L 2201/12

See application file for complete search history.

(56) References Cited

U.S. PATENT DOCUMENTS

| | | | |
|---|---|---|---|
| 7,258,347 | B2 | 8/2007 | Keefe et al. |
| 7,484,735 | B2 | 2/2009 | Verbrugge et al. |
| 7,845,648 | B2 | 12/2010 | Keefe et al. |
| 8,109,042 | B2 | 2/2012 | McKnight et al. |
| 8,240,677 | B2 | 8/2012 | Browne et al. |
| 8,789,314 | B2 | 7/2014 | Alexander et al. |

(Continued)

FOREIGN PATENT DOCUMENTS

| | | | |
|---|---|---|---|
| CN | 201310291 | Y | 9/2009 |
| CN | 202090802 | U | 12/2011 |

(Continued)

*Primary Examiner* — Justin B Rephann

(74) *Attorney, Agent, or Firm* — Quinn IP Law

(57) ABSTRACT

A sealing assembly includes a door and a seal. The door includes a flexible body that is movable between an open position and a closed position. The seal is movable between an engaged position in which the seal is positioned in engagement with a portion of the flexible body when the flexible body is in the closed position and a disengaged position in which the seal moves away from the portion of the flexible body as the flexible body moves from the closed position to the open position such that the flexible body is spaced from the seal to minimize frictional engagement with the seal.

19 Claims, 8 Drawing Sheets

(56) References Cited

U.S. PATENT DOCUMENTS

| | | | | |
|---|---|---|---|---|
| 2002/0074742 | A1* | 6/2002 | Quoiani | F16J 15/0806 277/627 |
| 2005/0198774 | A1* | 9/2005 | Henry | B60J 10/50 16/71 |
| 2005/0199440 | A1* | 9/2005 | Keefe | F16J 15/064 181/284 |
| 2006/0125188 | A1* | 6/2006 | Verbrugge | B60J 10/00 277/319 |
| 2009/0255187 | A1* | 10/2009 | Alexander | B60J 10/244 49/477.1 |
| 2013/0126106 | A1* | 5/2013 | Hindman | B60J 5/14 160/238 |
| 2015/0068686 | A1* | 3/2015 | Hindman | B60J 5/14 160/40 |
| 2015/0082704 | A1* | 3/2015 | Gamble | E06B 9/582 49/306 |

FOREIGN PATENT DOCUMENTS

| | | | |
|---|---|---|---|
| CN | 202673082 | U | 1/2013 |
| JP | S5014238 | U | 2/1975 |
| JP | S577759 | Y2 | 2/1982 |
| JP | 2004092361 | A | 3/2004 |

* cited by examiner

SEALING ASSEMBLY

CROSS-REFERENCE TO RELATED APPLICATIONS

This application claims the benefit of U.S. Provisional Application No. 62/131,685, filed on Mar. 11, 2015, which is hereby incorporated by reference in its entirety.

TECHNICAL FIELD

The present disclosure relates to a sealing assembly.

BACKGROUND

Active material actuators utilize an active material that transforms when activated to provide an actuation motion. Shape memory alloys are a type of active material that transforms when activated, such as by joule heating when an electric current is applied. In general, shape memory alloy actuators have advantages over conventional actuators such as electric motors in that they can be less expensive, more compact, and lighter weight with silent operation and fewer components.

SUMMARY

The present disclosure provides a sealing assembly including a door and a seal. The door includes a flexible body that is movable between an open position and a closed position. The seal is movable between an engaged position in which the seal is positioned in engagement with a portion of the flexible body when the flexible body is in the closed position and a disengaged position in which the seal moves away from the portion of the flexible body as the flexible body moves from the closed position to the open position such that the flexible body is spaced from the seal to minimize frictional engagement with the seal.

The present disclosure also provides another sealing assembly including a support structure defining an opening, and a door. The door includes a flexible body that is movable between an open position and a closed position. The door covers the opening when in the closed position and at least partially uncovers the opening when in the open position. The sealing assembly further includes a seal. The seal includes a first body fixed to the support structure and a second body spaced from the first body. At least the second body is movable between an engaged position in which the second body is positioned in engagement with a portion of the flexible body when the flexible body is in the closed position and a disengaged position in which the second body moves away from the portion of the flexible body as the flexible body moves from the closed position to the open position such that the flexible body is spaced from the seal to minimize frictional engagement with the seal.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges. Additionally, the phrase "at least one of" as used herein should be construed to include the non-exclusive logical "or", i.e., A and/or B and so on depending on the number of components.

Referring to the Figures, wherein like numerals indicate like or corresponding parts throughout the several views, the features of a sealing assembly is generally shown throughout the Figures.

The sealing assembly includes a door 10 (see FIG. 1) movable between an open position and a closed position. The door 10 can be moved between the open and closed position manually or automatically. One non-limiting example is that the door 10 can be automatically moved by utilizing a motor.

More specifically, the door 10 includes a flexible body 12 that is movable between the open and closed positions. The door 10 can roll up into a housing 14 when in the open position. Therefore, the door 10 can be a fabric door, a multi-panel door, a membrane panel door or any other type of door 10 that allows the door 10 to roll up. The flexible body 12 is formed of any suitable materials and/or any suitable configuration, and can include the types of doors 10 discussed above, i.e., fabric, multi-panel, membrane panel, etc. Generally, the flexible body 12 is configured to allow the door 10 to roll up into the housing 14. Alternatively, the door 10 can be a swinging door. The door 10 can be for a refrigerated unit or room, a freezer unit or room, or any other suitable door 10. The sealing assembly can improve sealing of the door 10 and also minimize frictional engagement between various components as the door 10 is moving, which will be discussed further below. Furthermore, the sealing assembly can be utilized in applications other than doors 10, for example, windows, etc.

Figure 2:
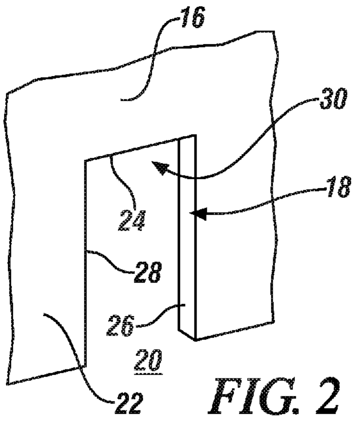
FIG. 2 is a schematic perspective view of a support structure.

Also referring to FIG. 2, the sealing assembly can also include a support structure 16 defining an opening 18. Generally, the door 10 is movably attached to the support structure 16. The door 10 is removed from FIG. 2 to illustrate the opening 18. The door 10 covers the opening 18 when in the closed position and at least partially uncovers the opening 18 when in the open position. The support structure 16 can be any suitable configuration. For example, the support structure 16 can be a stationary structure such as a room in a building or can be part of a vehicle to transport, for example, refrigerated/frozen food, etc. As another example, the support structure 16 can be a stand-alone unit that can be moved to a desired location, such as into a room of a building or into a box truck for transportation, etc.

Figure 1:
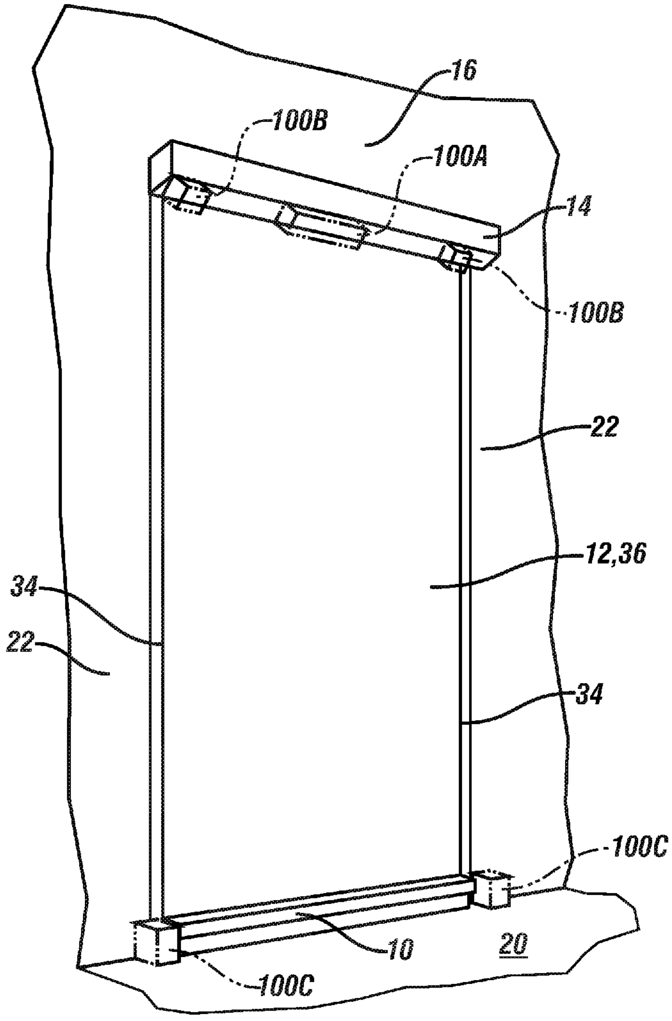
FIG. 1 is a schematic perspective view of a sealing assembly.

Generally, the support structure 16 can include a floor 20 and one or more walls 22. Referring to FIG. 2, the opening 18 is defined by the wall 22, or walls 22, such that the wall 22 surrounds the opening 18 by a top edge 24, a first side edge 26 and a second side edge 28 opposing the first side edge 26. Generally, the top edge 24 is disposed between the first and second side edges 26, 28 and the top edge 24 is spaced from the floor 20. Beyond the opening 18, the support structure 16 can open into another area 30 for storing/transporting items. In certain embodiments, the housing 14 is supported by the support structure 16 adjacent to the top edge 24, and in this configuration, the door 10 moves from the closed position to the open position by retracting away from the floor 20 and toward the top edge 24. Hence, the door 10 as illustrated in FIG. 1 moves up and down relative to the floor 20. As such, the door 10 slides relative to the walls 22.

The sealing assembly also includes a seal 32 (various features of the seal 32 are best shown in FIGS. 3-17) that can abut or engage at least a portion of the door 10 when the door 10 is in the closed position. The seal 32 is configured to be selectively spaced from the door 10 when the door 10 is in the open position for ease of opening 18 the door 10. The seal 32 is spaced from the door 10 when the door 10 is in the open position. When the door 10 is moving to the open position or the closed position, the seal 32 is designed to minimize engagement with the door 10 to minimize friction therebetween. Minimizing friction between the door 10 and the seal 32 can reduce wear on the door 10, reduce wear on the seal 32 and increase the speed of opening/closing the door 10. The seal 32 is fixed to the support structure 16, which is discussed further below, and therefore, the door 10 slides relative to the seal 32; as such, spacing the seal 32 away from the door 10, as the door 10 moves from, for example, the closed position to the open position, increases the life of the seal 32 due to the minimal frictional engagement. Generally, the seal 32 can be formed of rubber material(s), soft plastic(s), or any other suitable material which provides elasticity and/or movement.

Separate seals 32 can be utilized along the top edge 24, the first side edge 26 and/or the second side edge 28. Therefore, any of the configurations of the seal 32 described herein can be utilized along/adjacent to any or all of edges 24, 26, 28 of the support structure 16.

The seal 32 can abut one or more edges 34 of the door 10 when the door 10 is in the closed position. The edges 34 of the door can face the opening 18 of the support structure 16, and in this configuration, part of the seal 32 is fixed to one or more of the top edge 24, the first side edge 26 and the second side edge 28 of the support structure 16, i.e., the seal 32 faces into the opening 18 and faces the respective edges 24, 26, 28 of the door 10. Alternatively, or in addition to, the seal 32 can abut one or more sides 36, 38 of the door 10 when the door 10 is in the closed position. If FIG. 1 is illustrating a first side 36 of the door 10, a second side 38 (shown in FIG. 3) of the door 10, which opposes the first side 36, can overlap a portion of the support structure 16 such that the door 10, in the instance of FIG. 1, is in front of the opening 18 of the support structure 16. In this configuration, the side edges 34 of the door overlap with the support structure 16. When the second side 38 overlaps, the seal 32 can be fixed to the support structure 16 to face the part of the second side 38 of the door 10 that overlaps the support structure 16, i.e., the seal 32 can be fixed to the support structure 16 adjacent to, and in front of the opening 18. It is to be appreciated that the door 10 and the seal 32 can be repositioned to behind the opening 18, and the same principle discussed above applies. Furthermore, for the type of door 10 that rolls up into the housing 14, the seal 32 along the top edge 24 abuts one of the first and second sides 36, 38 of the door 10.

The seal 32 is movable between an engaged position (see FIG. 3) in which the seal 32 is positioned in engagement with a portion of the flexible body 12 when the flexible body 12 is in the closed position and a disengaged position (see FIG. 4) in which the seal 32 moves away from the portion of the flexible body 12 as the flexible body 12 moves from the closed position to the open position such that the flexible body 12 is spaced from the seal 32 to minimize frictional engagement with the seal 32. Therefore, the seal 32 can be a bistable seal 32, which transitions between two states. For example, the seal 32 can be in the engaged position that engages one or more of the edges 24, 26, 28 of the door 10 and the disengaged position that disengages from the door 10 such that the door 10 can easily be raised or lowered. The transition of the seal 32 between the engaged and disengaged positions can be initiated actively or passively. As the seal 32 moves to the disengaged position, the seal 32 can pull away from the door 10. Said differently, the seal 32 can lean away from the door 10 as the seal 32 moves to the disengaged position. Therefore, a shear force can be applied to the seal 32 which causes the seal 32 to pull away from the door 10. Furthermore, the seal 32 can move away from the door 10 due to stretching of the seal 32 as the seal 32 moves to the second position. As such, in certain embodiments, the seal 32 can selectively deform. The seal 32 can have many different configurations as best illustrated in FIGS. 5-17, the details of which are discussed further below.

Referring generally to FIGS. 3-6, the seal 32 can include a first body 40 fixed to the support structure 16 and a second body 42 spaced from the first body 40. At least the second body 42 is movable between the engaged position in which the second body 42 is positioned in engagement with the portion of the flexible body 12 when the flexible body 12 is in the closed position and the disengaged position in which the second body 42 moves away from the portion of the flexible body 12 as the flexible body 12 moves from the closed position to the open position such that the flexible body 12 is spaced from the seal 32 to minimize frictional engagement with the seal 32. Simply stated, the second body 42 engages the portion of the flexible body 12 when in the engaged position and is spaced from the portion of the flexible body 12 when in the disengaged position. Due to the first body 40 being fixed to the support structure 16, the entire seal 32 cannot separate from the support structure 16, as such, the seal 32 leans when in the disengaged position.

Various suitable materials of the seal 32 have been discussed above, and it is to be appreciated that the materials discussed above also apply to the first and second bodies 40, 42, i.e., can be formed of rubber material(s), soft plastic(s), or any other suitable material which provides elasticity and/or movement.

Referring to FIGS. 3, 4, 7, 8 and 10, the second body 42 can optionally include a bulb 44 that engages the portion of the flexible body 12 when in the engaged position. The bulb 44 can be any suitable configuration, some of which are illustrated and/or described herein. In certain embodiments, the bulb 44 can be eliminated and one or more lip(s), one or more flange(s), etc., can be utilized as part of the second body 42.

Referring to FIGS. 3, 4, 11 and 12, the second body 42, and more specifically in certain embodiments, the bulb 44 can include an outer surface 46 and an inner surface 48. The inner surface 48 can define an aperture 50 along a longitudinal axis 52. The inner surface 48 is circumferentially closed relative to the longitudinal axis 52. Therefore, the outer surface 46 faces away from the longitudinal axis 52 and the inner surface 48 faces toward the longitudinal axis 52. A portion of the outer surface 46 can engage the portion of the door 10 when in the engaged position.

Figure 12:
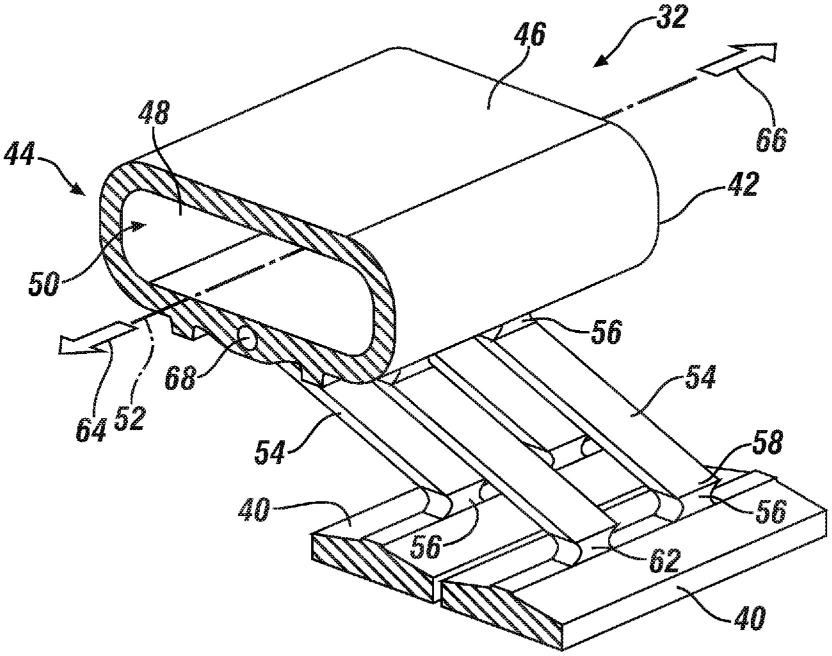
FIG. 12 is a schematic perspective cross-sectional view of the seal of FIG. 11 with an insert removed.
Figure 14:
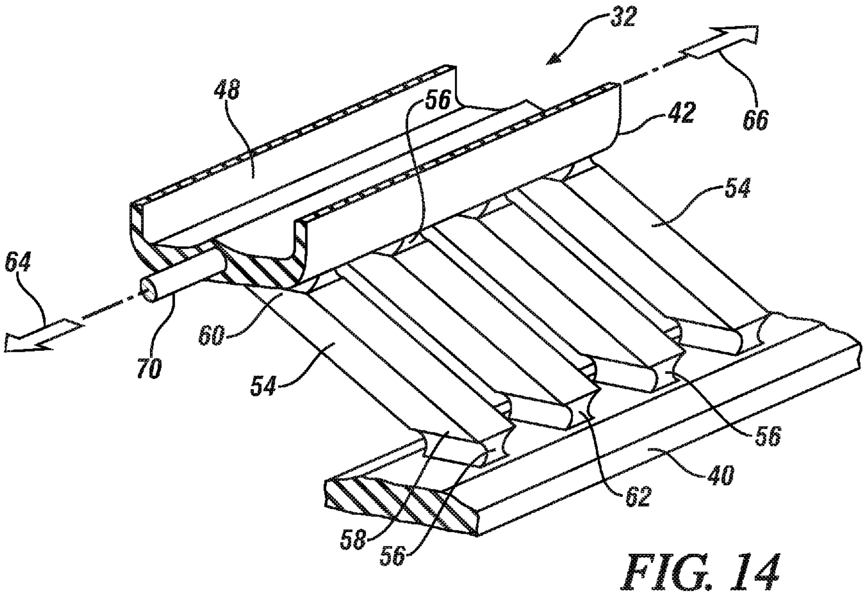
FIG. 14 is a schematic cross-sectional view of a seal illustrating another configuration of the legs.

Continuing with FIGS. 3-6 and 11-14, the seal 32 can include a plurality of legs 54 disposed between the first and second bodies 40, 42. Therefore, the legs 54 space the first and second bodies 40, 42 apart. The legs 54 can be any suitable configuration and/or orientation, and FIGS. 12 and 14 illustrate different examples. The legs 54 can assist in increasing stiffness of the seal 32, and/or providing an easier way to manufacture the seal 32.

Referring to FIGS. 3-6, 11 and 13, each of the legs 54 can include at least one hinge 56 which assists in allowing movement of the legs 54 relative to the first body 40. As the legs 54 move, the second body 42 also moves (compare FIGS. 3 and 4 or compare FIGS. 5 and 6). Each of the legs 54 can include a first end 58 and a second end 60 spaced from each other. The hinge 56 can be disposed at one of the first and second ends 58, 60 of each of the legs 54. Therefore, the hinge 56 is either disposed between the first end 58 and the first body 40, or disposed between the second end 60 and the second body 42.

In certain embodiments, the at least one hinge 56 is further defined as a plurality of hinges 56. A respective one of the hinges 56 is connected to the first and second ends 58, 60 of the legs 54 such that respective hinges 56 connect the first end 58 of respective legs 54 to the first body 40 and other respective hinges 56 connect the second end 60 of respective legs 54 to the second body 42. Simply stated, each of the legs 54 can include two hinges 56, i.e., one hinge 56 at the first end 58 and another hinge 56 at the second end 60. As such, some of the hinges 56 are disposed between the first end 58 of the legs 54 and the first body 40, and other hinges 56 are disposed between the second end 60 of the legs 54 and the second body 42.

In certain embodiments, the hinge 56 can define a groove 62 around each of the legs 54. In other embodiments, the hinges 56 can define the groove 62 around each of the first and second ends 58, 60 of each of the legs 54. The grooves 62 assist in allowing movement of the legs 54. The groove 62 can be any suitable configuration and/or location, and it is to be appreciated that the groove 62 can partially or completely surround the legs 54.

Figure 4:
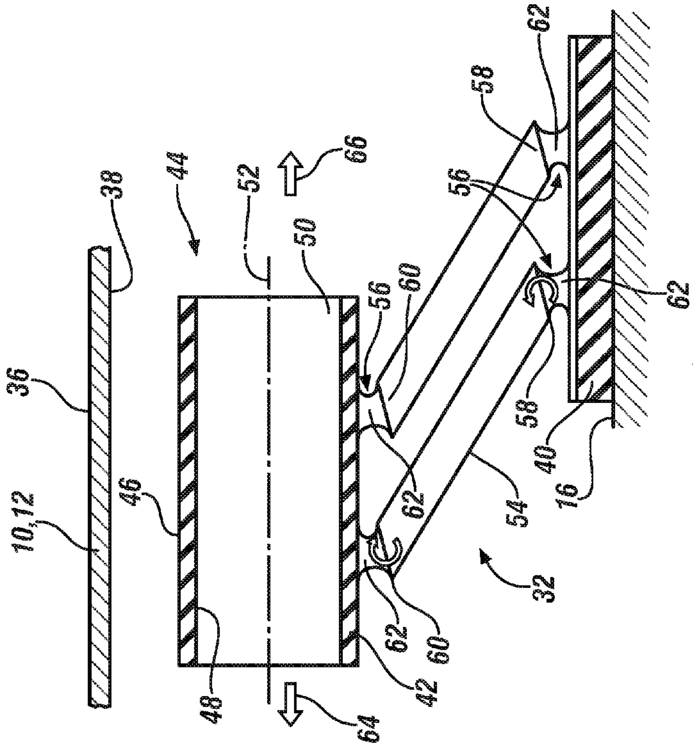
FIG. 4 is a schematic cross-sectional view of the seal of FIG. 3 in a disengaged position.
Figure 3:
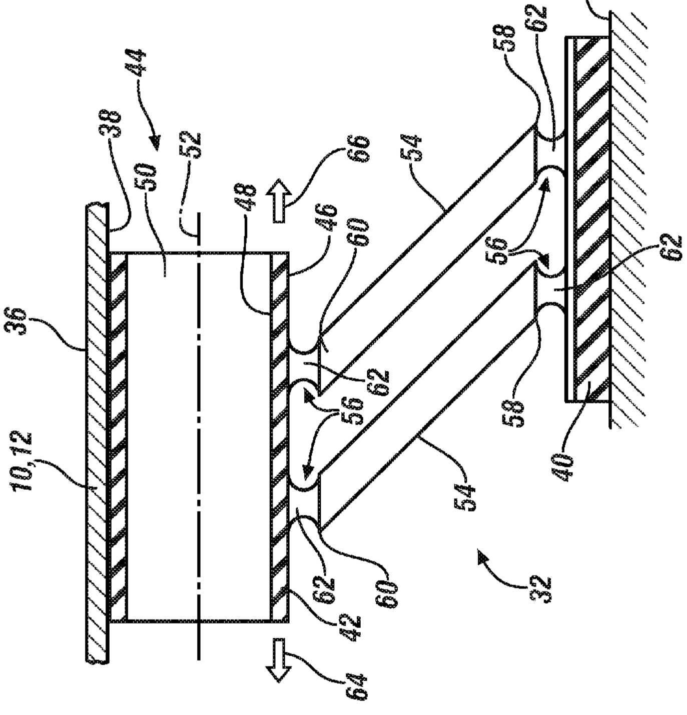
FIG. 3 is a schematic cross-sectional view of a seal in an engaged position, with the seal engaging a door.

Directional references herein are utilized to assist in describing the figures, but it is to be appreciated that depending on the location of the seal 32 relative to the door 10, and which way the seal 32 is designed to move, the directional references can be different. FIGS. 3 and 4 illustrate when the second body 42 moves in the direction of arrow 64, the legs 54 lean in the same direction of the arrow 64 such that the hinge 56 provides counter-clockwise movement at the first end 58, and the hinge 56 at the second end 60 provides clockwise movement at the second end 60. When moving the second body 42 in the opposite direction of arrow 64, i.e., in the direction of arrow 66, the legs 54 move back toward upright such that the hinge 56 provides clockwise movement at the first end 58, and the hinge 56 at the second end 60 provides counter-clockwise movement at the second end 60. Therefore, in this orientation, the direction that the seal 32 shears away from the door 10 can be in the same direction as arrow 64. The seal 32 can move toward and away from the door 10 any suitable distance, and as one non-limiting example, the legs 54 can move about forty-six degrees in the direction that the seal 32 shears away from the door 10.

As mentioned above, the legs 54 can be any suitable configuration and location. For example, as shown in FIG. 14, the legs 54 can substantially align with each other and be spaced from each other in a row that is substantially parallel to the longitudinal axis 52. The row of the legs 54 can be centered relative to the second body 42 or the bulb 44, or can be offset relative to the center of the second body 42 or bulb 44.

Furthermore, as shown in FIG. 14, each of the legs 54 can be elongated in a direction transverse to the longitudinal axis 52. In other words, the legs 54 can be elongated perpendicular to the arrow 64/arrow 66. In certain embodiments, the legs 54 define a thickness and a width, with the width being greater than the thickness. The legs 54 being elongated allows movement of the legs 54 and the second body 42 back and forth relative to the arrow 64/arrow 66, but minimizes the ability of the legs 54 to move in a direction perpendicular to the arrow 64/arrow 66.

As shown in FIG. 12, the legs 54 can be a different configuration from FIG. 14. In FIG. 12, the legs 54 are split into a first row of legs 54 and a second row of legs 54 that are spaced side-by-side each other. The first row of legs 54 substantially align with each other and are spaced from each other substantially parallel to the longitudinal axis 52. The second row of legs 54 substantially align with each other and are spaced from each other substantially parallel to the longitudinal axis 52. In this configuration, all of the legs 54 can be supported by the first body 40, or the first body 40 can be split into two separate bodies 40, with the first row of legs 54 supported by one of the first bodies 40 and the second row of legs 54 supported by the other one of the first bodies 40.

Generally, the legs 54 of FIG. 12 are narrower than the legs 54 of FIG. 14, the narrower legs 54 allows the legs 54 and the second body 42 to move back and forth relative to the arrow 64/arrow 66 and also move back and forth perpendicular to arrow 64/arrow 66. As such, if the seal 32 along the top edge 24 of the support structure 16 is in a different orientation than the seal 32 along the first and second side edges 26, 28 of the support structure 16, the legs 54 and accordingly, the second body 42 can move in different directions.

In certain embodiments, the second body 42 of the seal 32 can define a hole 68 (see FIG. 12) spaced from the aperture 50. Furthermore, the seal 32 can include an insert 70 disposed in the hole 68 (see FIGS. 11 and 14). The insert 70 is more rigid than the second body 42 and/or the legs 54 so that when the insert 70 is pulled, the second body 42 and the legs 54 move. As such, movement of the insert 70 distributes motion to the seal 32. In certain embodiments, the insert 70 extends along the entire length of the seal 32 relative to the longitudinal axis 52. By having the insert 70 being the entire length of the seal 32, when the insert 70 is pulled a generally even distribution of motion is distributed to the entire length of the seal 32. It is to be appreciated that the insert 70 can be in other locations than illustrated.

The insert 70 can be any suitable configuration and formed of any suitable material. Generally, the insert 70 is a rod, a cable or a wire which is strong enough to move the second body 42 and the legs 54. Non-limiting examples of the configuration of the insert 70 can include a generally circular cross-sectional configuration (see FIGS. 11 and 14), a generally rectangular cross-sectional configuration (see FIGS. 7-10), a generally I-shaped cross-sectional configuration, a generally U-shaped cross-sectional configuration, a generally square cross-sectional configuration, etc. Any of the embodiments discussed herein can optionally utilize the insert 70. The insert 70 can be formed of metal, rigid plastic(s), or any other suitable material which is stiffer than the material that the seal 32 is formed of. In certain embodiments, the seal 32 is molded around the insert 70 or co-extruded with the insert 70. When eliminating the insert 70, the seal 32 can be molded without the insert 70. It is to be appreciated that the seal 32 can be formed by any suitable way, and non-limiting examples can include one or more of molding, extruding, stamping, injection molding, cutting, etc.

Figure 10:
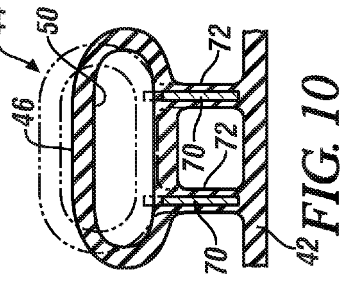
FIG. 10 is a schematic cross-sectional view of yet another bulb and a phantom view of the bulb to illustrate the differences between engaged and disengaged positions.
Figure 8:
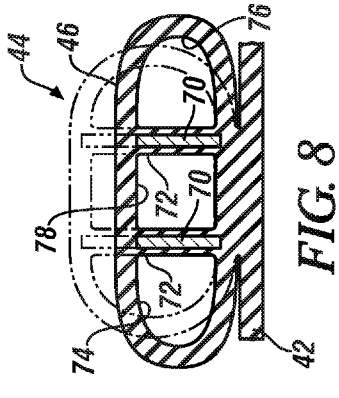
FIG. 8 is a schematic cross-sectional view of another bulb and a phantom view of the bulb to illustrate the differences between engaged and disengaged positions.
Figure 7:
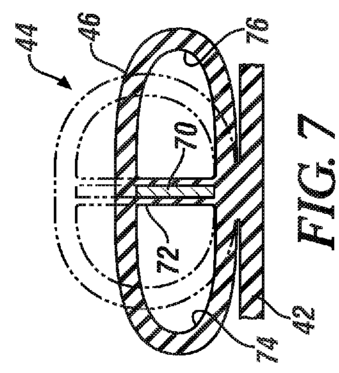
FIG. 7 is a schematic cross-sectional view of a bulb and a phantom view of the bulb to illustrate the differences between engaged and disengaged positions.
Figure 11:
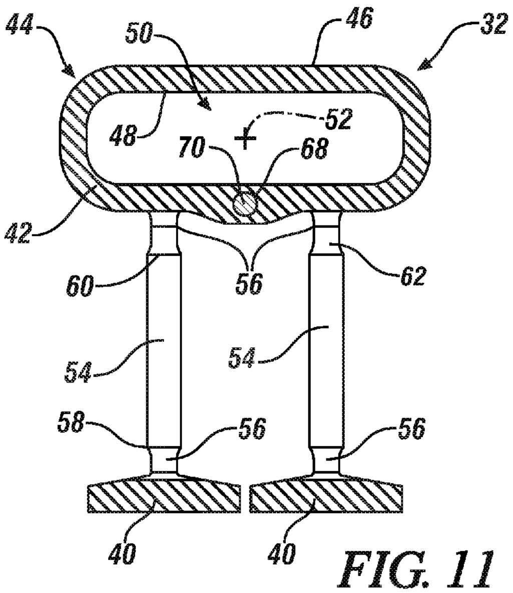
FIG. 11 is a schematic cross-sectional view of the seal of FIG. 3.
Figure 13:
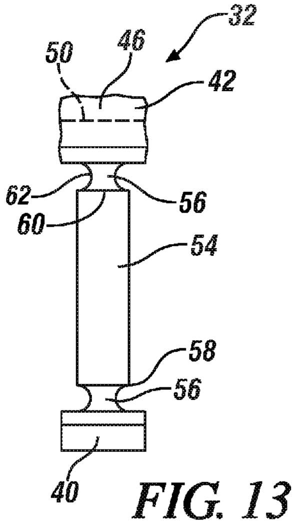
FIG. 13 is a schematic side view of a leg of the seal which illustrates hinges from a direction perpendicular to the orientation in FIG. 11.

Briefly, the other configurations of the bulb 44 in FIGS. 7, 8 and 10 are discussed below. As shown in FIG. 7, the bulb 44 can include at least one rib 72 disposed in the aperture 50 to split the aperture 50 into a first aperture segment 74 and a second aperture segment 76, with the first and second aperture segments 74, 76 circumferentially closed. In yet other embodiments, the rib 72 is further defined as a plurality of ribs 72 (FIG. 8) disposed in the aperture 50 and spaced from each other to split the aperture 50 into the first aperture segment 74, the second aperture segment 76 and a third aperture segment 78, with the first, second and third aperture segments 74, 76, 78 circumferentially closed. Furthermore, optionally, the bulb 44 of these embodiments can include the insert 70 disposed in the rib 72 to support the bulb 44, if there are a plurality of ribs 72, one insert 70 can be disposed in each of the ribs 72. Again, the insert 70 can be disposed along the entire length to provide a generally even distribution of motion to the entire length of the seal 32. Regarding FIG. 10, the bulb 44 includes a plurality of ribs 72 and respective inserts 70 disposed in each of the ribs 72, with the top having a circumferentially closed aperture 50 similar to the configuration of FIG. 11.

Figure 9:
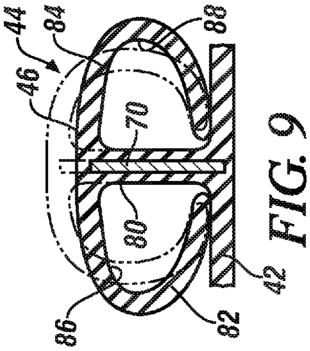
FIG. 9 is a schematic cross-sectional view of a configuration of a second body and a phantom view of the second body to illustrate the differences between engaged and disengaged positions.

In certain embodiments, as shown in FIG. 9, the second body 42 can include a center support 80, a first finger 82 and a second finger 84. The first and second fingers 82, 84 extend from the center support 80 and wrap around to define a first aperture segment 86 and a second aperture segment 88 which are circumferentially open to allow the first and second fingers 82, 84 to move back and forth relative to the center support 80. The insert 70 can be disposed in the center support 80, as shown in FIG. 9. The second body 42 can include one or more lip(s), finger(s) and/or flange(s), etc., that do not create a circumferentially closed aperture(s).

Figure 5:
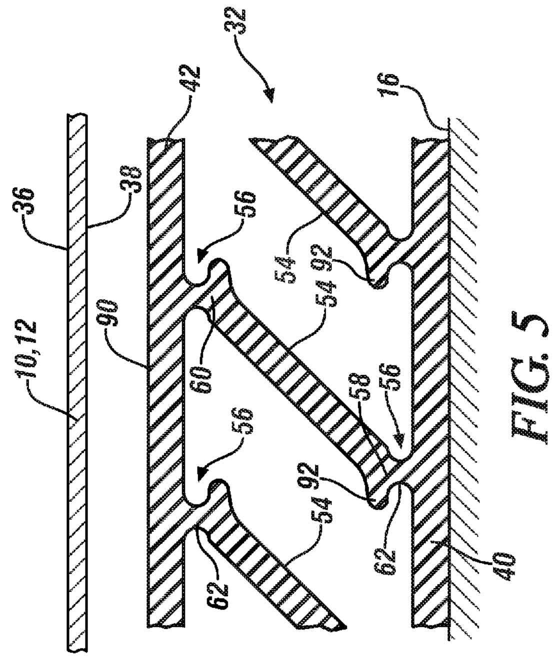
FIG. 5 is a schematic cross-sectional view of another seal in a disengaged position.

Any of these bulb 44 configurations and the second body 42 configurations can be utilized with the legs 54 of FIGS. 5, 12 and 14. Furthermore, FIGS. 7-10 illustrate a cross-sectional view of the different bulbs 44 and a cross-sectional view of one configuration of the fingers 82, 84 as well as phantom lines of the bulbs 44/the fingers 82, 84 to generally show the changes in the bulbs 44/the fingers 82, 84 between the engaged and disengaged positions. Movement of the bulbs 44/the fingers 82, 84 in FIGS. 7-10 is into and out of the page, so the insert 70 of the bulbs 44/the fingers 82, 84 in FIGS. 7-10 appear to increase in size, but that is an illusion due to the bulb 44/the fingers 82, 84 moving into and out of the page.

Figure 6:
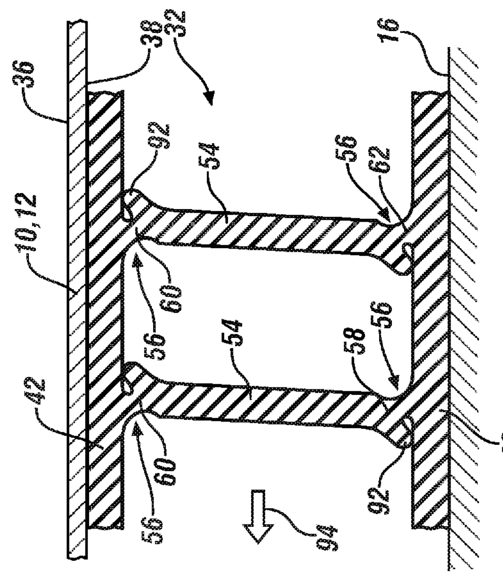
FIG. 6 is a schematic cross-sectional view of the seal of FIG. 5 in an engaged position, with the seal engaging the door.

In yet another embodiment, as shown in FIGS. 5 and 6, the second body 42 can include an engagement surface 90 that engages the portion of the flexible body 12 when in the engaged position. The engagement surface 90 can define a generally flat configuration. Alternatively, any of the bulbs 44, the fingers 82, 84, the lips, the flanges, etc., discussed herein can be added to the second body 42 of this embodiment (FIGS. 5 and 6). In addition, this seal 32 can optionally include the insert 70.

The legs 54 of this embodiment include one or more projection(s) 92 (see FIGS. 5 and 6) which limit the amount of movement of the seal 32, i.e., the projections 92 act as stops. In certain embodiments, the projections 92 are disposed at the ends 58, 60 of the legs 54. For example, respective hinges 56 can be disposed between the projection 92 of each of the legs 54 and the first body 40, and/or other respective hinges 56 can be disposed between the projection 92 of each of the legs 54 and the second body 42. In certain embodiments, each of the legs 54 include a plurality of projections 92, and thus, one of the projections 92 can be disposed at the first end 58 and another one of the projections 92 can be disposed at the second end 60. Generally, the projections 92 of each of the legs 54 are spaced from the first and second bodies 40, 42 when the seal 32 is in the disengaged position (see FIG. 5), and the projections 92 of each of the legs 54 engage respective first and second bodies 40, 42 when the seal 32 is in the engaged position (see FIG. 6). When the projections 92 engage respective first and second bodies 40, 42, the seal 32 is prevented from continuing to move in a particular direction, and in FIG. 6, the direction is identified with arrow 94.

Figure 15:
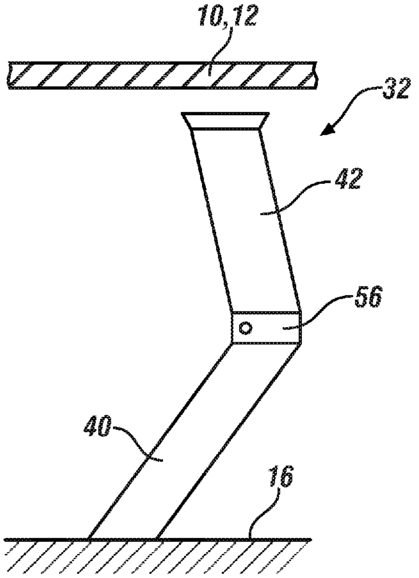
FIG. 15 is a schematic side view of another seal with an arrow indicating the directions of movement of the seal relative to the door.
Figure 16:
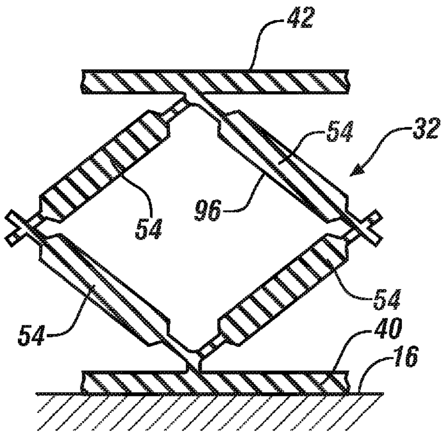
FIG. 16 is a fragmentary cross-sectional view of yet another seal.
Figure 17:
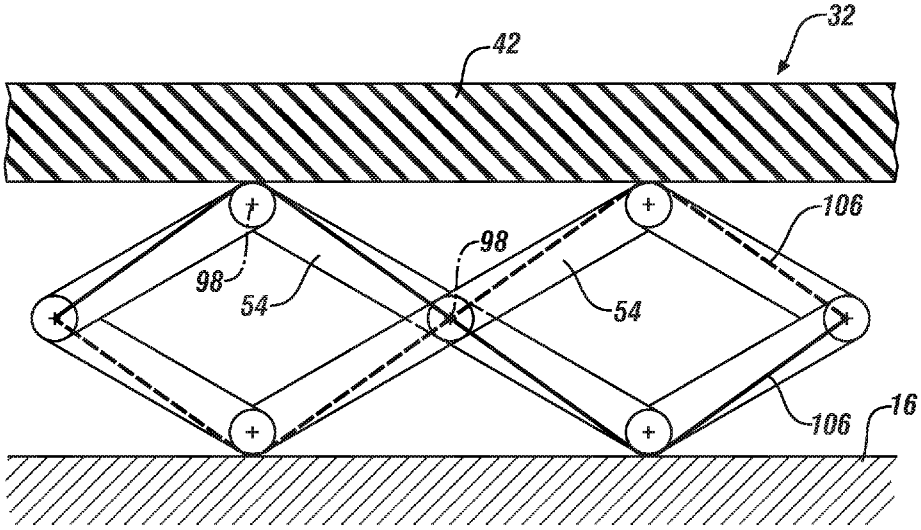
FIG. 17 is a fragmentary partial cross-sectional view of yet another seal.

Additional configurations of the seal 32 are shown in FIGS. 15-16. FIG. 15 illustrates the first and second bodies 40, 42 separated by the hinge 56, with the legs 54 eliminated. FIG. 16 illustrates a plurality of legs 54 connected together to define a central through-hole 96 between the legs 54, such that the legs 54 define a generally diamond cross-sectional configuration. For FIG. 16, the legs 54 move closer to each other which shrinks the central through-hole 96 and the legs 54 move away from each other to enlarge the central through-hole 96 as the seal 32 moves between the engaged and disengaged positions. FIG. 17 illustrates a scissor type of seal 32 in which the legs 54 pivot relative to a plurality of pivot points 98 which moves the second body 42 back and forth relative to the support structure 16. The embodiment of FIG. 17 will be discussed further below. Again, any of the bulbs 44, the fingers 82, 84, the lips, the flanges, etc., discussed herein can be added to these embodiments. Optionally, any of the bulbs 44, the fingers 82, 84, the lips, the flanges, etc., discussed herein can include one or more recesses and/or one or more protrusions to provide more compliance in certain areas of the bulb 44, the fingers 82, 84, the lips, the flanges, etc. It is to be appreciated that the movement of the seal 32 is exaggerated in the figures for illustrative purposes only.

As mentioned above, the seal 32 can be movable between the engaged and disengaged positions. For example, the seal 32 can be movable by an actuator 100, i.e., actively (see FIGS. 1, 18, 19 and 24-26) or by movement of the door 10, i.e., passively (see FIG. 27). Optionally, when the seal 32 is to return to one of the engaged and disengaged positions once the SMA actuator 100 is off, the seal 32 can be configured to naturally bias back to one of the engaged and disengaged positions. Furthermore, one or more actuators 100 can be utilized, and FIG. 1 illustrates non-limiting examples of the general location that different actuators 100 can be mounted relative to the support structure 16. The actuator 100 can be a motor and/or a solenoid device, a shape memory alloy (SMA) actuator 100, etc. The actuator(s) 100 can be housed within the housing 14 for the door 10, or can be a separate unit that can be attached to the housing 14 and/or attached to the support structure 16.

Figure 23:
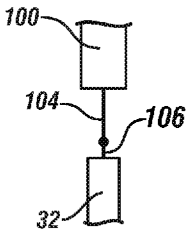
FIG. 23 is a schematic illustration of an actuator including a cable that is attached to an insert of a seal.
Figure 20:
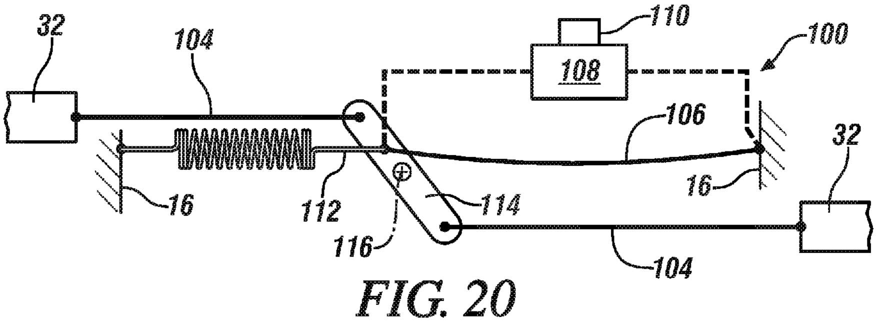
FIG. 20 is a schematic illustration of a shape memory alloy (SMA) actuator.
Figure 21:
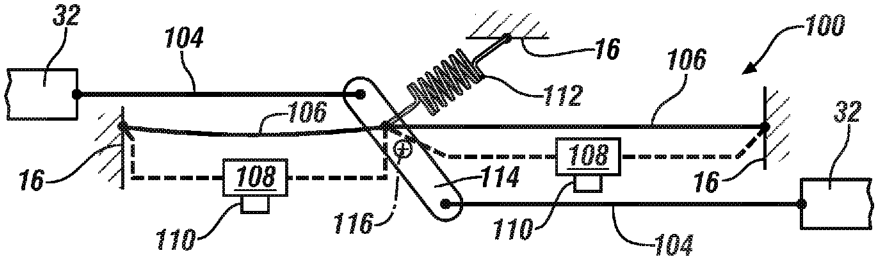
FIG. 21 is a schematic illustration of another SMA actuator.
Figure 22:
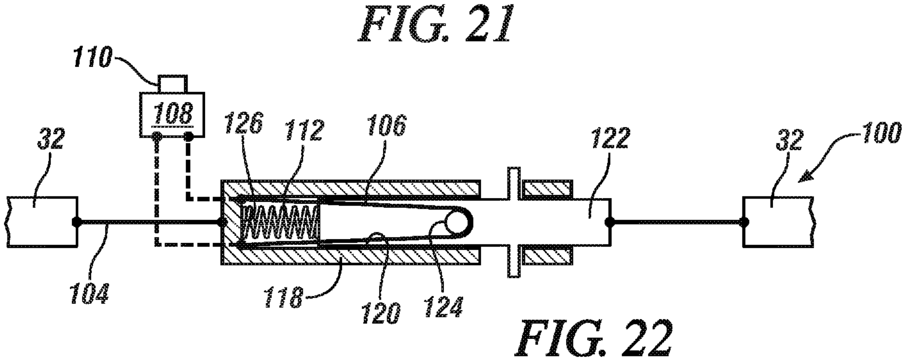
FIG. 22 is a schematic illustration of yet another SMA actuator.

For example, the SMA actuator 100 can be operatively coupled to the seal 32 to move the seal 32 to at least one of the engaged and disengaged positions. The SMA actuator 100 can have many different configurations, and non-limiting examples are illustrated in FIGS. 20-22. For the embodiments that utilize the insert 70, the SMA actuator 100 can be coupled to the insert 70 to move the seal 32 to at least one of the engaged and disengaged positions, as best shown in FIG. 23. If utilizing more than one insert 70, the SMA actuator 100 can be coupled to one of the inserts 70, more than one of the inserts 70 or all of the inserts 70.

Figure 18:
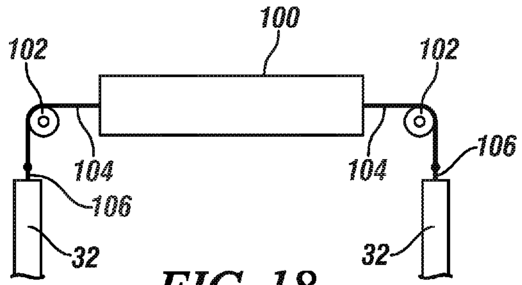
FIG. 18 is a schematic illustration of an actuator including a cable coupled to a pair of seals.

When utilizing only one SMA actuator 100, the seals 32 along the first and second side edges 26, 28 can both move due to an arrangement as shown in FIG. 18. The SMA actuator 100 includes a pair of pulleys 102, with one of the pulleys 102 disposed adjacent to each of the corners between the top edge 24 and the first and second side edges 26, 28. The SMA actuator 100 can include a cable 104 that is attached to the seal 32. FIG. 18 illustrates the seal 32 schematically and any of the configurations of the seal 32 are represented by this schematic illustration. When the SMA actuator 100 is actuated, the cable 104 pulls on the seal 32 which causes the second body 42 to move from the engaged position to the disengaged position. If the seal 32 is designed to be in the disengaged position when the SMA actuator 100 is off, then when the SMA actuator 100 is actuated, the cable 104 pulls the seal 32 from the disengaged position to the engaged position. The actuator 100 labeled 100A in FIG. 1 can represent the general location for the actuator 100 of FIG. 18.

Figure 19:
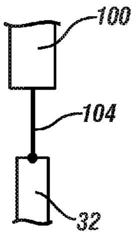
FIG. 19 is a schematic illustration of another actuator including a cable coupled to one seal.

When utilizing a plurality of SMA actuators 100, one of the actuators 100 can move the one of the seals 32 and another one of the actuators 100 can move another one of the seals 32. The SMA actuators 100 can each include the cable 104 that is attached to the seal 32. FIG. 19 can represent both of the SMA actuators 100 and the seal 32 is schematically shown such that any of the configurations of the seal 32 are represented by this schematic illustration. The actuators 100 labeled 100B in FIG. 1 can represent the general location for the pair of actuators 100 of FIG. 19. When the SMA actuators 100 are actuated, the cable 104 pulls on the respective seals 32 which cause the second body 42 of each of the seals 32 to move from the engaged position to the disengaged position. If the seals 32 are designed to be in the disengaged position when the SMA actuators 100 are off, then when the SMA actuators 100 are actuated, the cable 104 pulls the seals 32 from the disengaged position to the engaged position.

All of the SMA actuators 100 described herein can include one or more SMA wire(s) 106. The SMA actuator 100 is selectively activated by electric current supplied by a power source 108 at a selected voltage. The SMA wire 106 undergoes joule heating when electrically activated, causing the SMA wire 106 to contract in a predetermined direction. The sealing assembly can include a switch 110 that opens and closes to regulate power flow to the SMA wire 106. Furthermore, the SMA actuator 100 can optionally include a return spring 112.

Turning to FIG. 20, the SMA actuator 100 can include a lever 114 that is rotatable about a pivot axis 116 between a first position and a second position. The SMA wire 106 is fixed to the lever 114 and fixed to a stationary member, which can include the support structure 16 and/or a housing of the SMA actuator 100. One or more cables 104 are attached to respective ends of the lever 114, and the cables 104 are attached to respective seals 32. Therefore, movement of the lever 114 between the first and second positions causes the cables 104 to move, which correspondingly causes the seals 32 to move between the engaged and disengaged positions. Optionally, the return spring 112 is attached to the lever 114 to return the lever 114 back to its original position, such as the first position. The return spring 112 and the SMA wire 106 are attached to the lever 114 away from the pivot axis 116. FIG. 20 has eliminated the pulleys 102 for illustrative purposes only, but it is to be appreciated that the cables 104 would extend over respective pulleys 102 when utilizing one actuator 100. When the SMA wire 106 is heated, the SMA wire 106 contracts which pulls the lever 114 to rotate the lever 114 about the pivot axis 116, which causes the cables 104 to pull respective seals 32 which causes the seals 32 to move to either the engaged position or the disengaged position. For the configuration of FIG. 20, heating the SMA wire 106 causes the lever 114 to rotate clockwise relative to the pivot axis 116. If only one seal 32 is to be moved by one SMA actuator 100, then one of the cables 104 can be removed.

Referring to FIG. 21, a plurality of SMA wires 106 can be utilized, with one SMA wire 106 disposed on one side of the lever 114 and another SMA wire 106 disposed on the other side of the lever 114. This embodiment can also be utilized to pull two seals 32 or only one seal 32 as described above. In this configuration, one SMA wire 106 is heated at a time, i.e., the SMA wires 106 are not simultaneously heated. When one of the SMA wires 106 is heated, the SMA wire 106 contracts which pulls the lever 114 to rotate the lever 114 about the pivot axis 116 counter-clockwise, which causes the cables 104 to pull the respective seals 32 and causes the seals 32 to move to either the engaged position or the disengaged position. When the lever 114 reaches over center, the spring 112 pushes or pulls the lever 114 to rotate the lever 114 the rest of the way. The spring 112 either pushes or pulls depending on the location of the spring 112 relative to the lever 114. When the other SMA wire 106 is heated, the SMA wire 106 contracts which pulls the lever 114 to rotate the lever 114 about the pivot axis 116 clockwise, which causes the cables to pull the respective seals 32 in the opposite direction to one of the engaged or disengaged positions. Again, when the lever 114 reaches over center, the spring 112 pushes or pulls the lever 114 to rotate the lever 114 rest of the way. Once the spring 112 takes over moving the lever 114, the power source 108 for the respective SMA wires 106 can be turned off so that the SMA wire 106 can cool down which causes the respective SMA wires 106 to relax, expand or lengthen. Optionally, one power source 108 can operate both of the SMA wires 106, or alternatively, a plurality of power sources 108 can be utilized, with one of the power sources 108 operating one of the SMA wires 106, and another one of the power sources 108 operating the other one of the SMA wires 106.

Referring to FIG. 22, the SMA actuator 100 can include a body 118 defining a cavity 120, with a plunger 122 partially disposed in the cavity 120. A post 124 extends from the plunger 122 and the SMA wire 106 is attached to a bottom 126 of the body 118 inside the cavity 120 and wraps around the post 124. The return spring 112 is disposed in the cavity 120 between the bottom 126 of the body 118 and an end of the post 124. One of the cables 104 is attached to the body 118 and one of the seals 32 and another one of the cables 104 is attached to the plunger 122. When the SMA wire 106 is heated, the SMA wire 106 contracts which pulls the post 124 and the bottom 126 of the body 118 toward each other which pulls the cables toward each other, which causes the seals 32 to move to either the engaged position or the disengaged position. If only one seal 32 is to be moved by one SMA actuator 100, then one of the cables 104 can be removed.

For each of the SMA actuators 100 discussed above for FIGS. 20-22, the SMA wire 106 can be heated by applying the power source 108. The power source 108 regulates the power flow to the SMA wire 106 as discussed above. Therefore, when the power source 108 is off, the SMA wire 106 cools down, and the SMA wire 106 relaxes, expands, lengthens, etc.; and when the power source 108 is on, the SMA wire 106 heats up and the SMA wire 106 contracts, shortens, etc. The switch 110 can be in electrical communication with the power source 108 to selectively switch the power source 108 on and off. As one non-limiting example, when it is desired to open the door 10, the power source 108 can be turned on which heats the corresponding SMA wire 106 and causes the seal 32 to pull away from the door 10 to the disengaged position, so that when the door 10 moves from the closed position to the open position, the seal 32 is spaced apart from the door 10. Continuing with this example, the power source 108 can remain on until the door 10 closes again and then the power source 108 turns off such that the seal 32 returns to the engaged position.

Also, a controller can be in communication with the power source 108 and/or the switch 110 to control the SMA actuator 100. The controller can include a processor and a memory on which is recorded instructions for communicating with the switch 110 and the power source 108, etc. The controller is configured to execute the instructions from the memory, via the processor. The memory can include, tangible, non-transitory computer-readable memory, such as read-only memory (ROM) or flash memory, etc. The controller can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller can include all software, hardware, memory, algorithms, connections, sensors, etc., necessary to communication with the power source 108 and/or the switch 110, etc.

Figure 24:
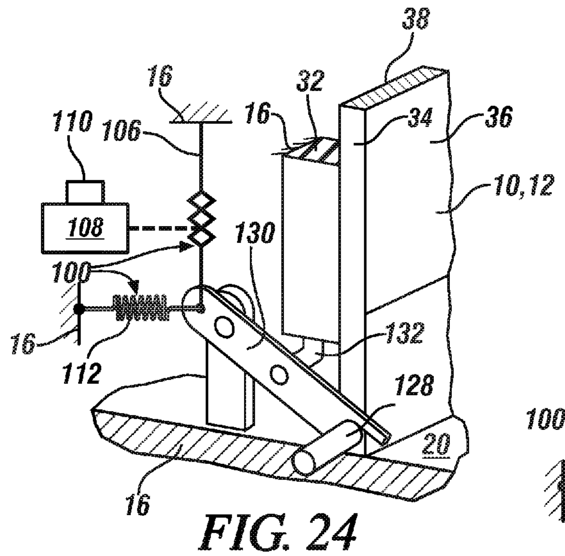
FIG. 24 is a schematic illustration of a latch engaging an extension of the door in a locked position, with the seal in the engaged position and the door in a closed position.
Figure 25:
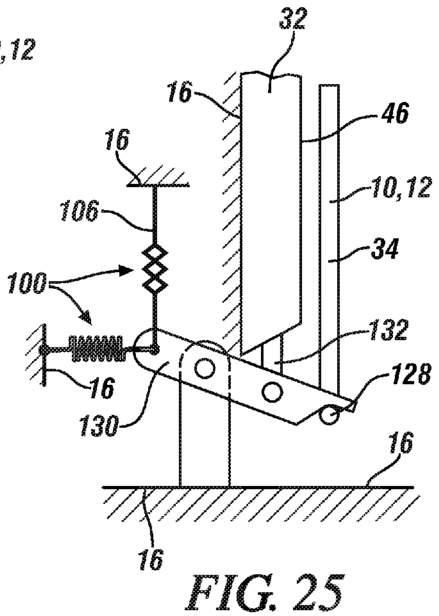
FIG. 25 is a schematic illustration of the latch of FIG. 24 moving toward an unlocked position, with the seal in the disengaged position and the door moving toward the open position.
Figure 26:
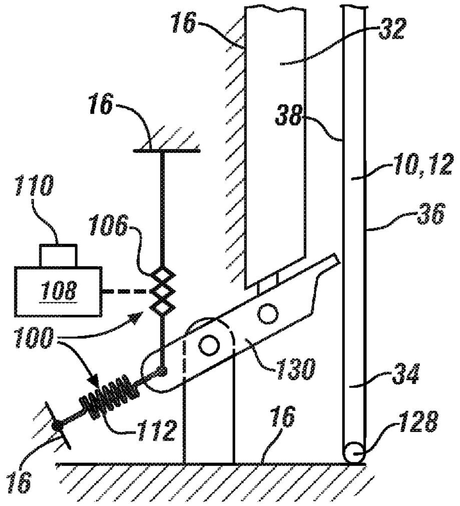
FIG. 26 is a schematic illustration of the latch of FIGS. 24 and 25 in the unlocked position and the door back to the closed position.

Referring to FIGS. 24-26, the door 10 can include an extension 128. Furthermore, a latch 130 is movable between a locked position engaging the extension 128 and corresponding to the seal 32 being in the engaged position, and an unlocked position disengaging from the extension 128 and corresponding to the seal 32 being in the disengaged position. Movement of the door 10 from the closed position to the open position causes the seal 32 to move from the engaged position to the disengaged position. FIG. 24 is a schematic of the door 10 in the closed position and the seal 32 in the engaged position. As the door 10 moves toward the open position, the latch 130 engages the extension 128, and this engagement rotates the latch 130 about a pivot axis 116. As the latch 130 rotates, a member 132 that extends from the latch 130 and is attached to the seal 32/cable 104, pushes the seal 32 to the disengaged position (see FIG. 25). FIG. 26 illustrates the latch 130 in the unlocked position and the seal 32 fully in the disengaged position, and from this position, once the door 10 returns to the closed position (which is also shown in FIG. 26), then the SMA actuator 100 can be utilized to return the seal 32 to the engaged position and the latch 130 to the locked position. As such, the SMA actuator 100 can be coupled to the latch 130 to move the latch 130 to at least one of the locked and unlocked positions. The SMA wire 106 can be heated which causes the SMA wire 106 to contract and rotate the latch 130 back into engagement with the extension 128 (back to the locked position) which resets the latch 130 for the next time the door 10 is opened.

Alternatively, or in addition to the discussion for FIGS. 24-26, the location of the SMA wire 106 can be moved such that heating the SMA wire 106 causes the latch 130 to rotate to the unlocked position and move the seal 32 to the disengaged position when the door 10 begins moving to the open position; and in this embodiment, the SMA actuator 100 can include the return spring 112 to return the seal 32 to the engaged position, and the latch 130 back to the locked position and into engagement with the extension 128 when the door 10 is in the closed position. The actuators 100 labeled 100C in FIG. 1 can represent the general location for the actuator 100 of FIGS. 24-26; therefore one or more actuators 100 can be utilized for the embodiment of FIGS. 24-26.

Figure 27:
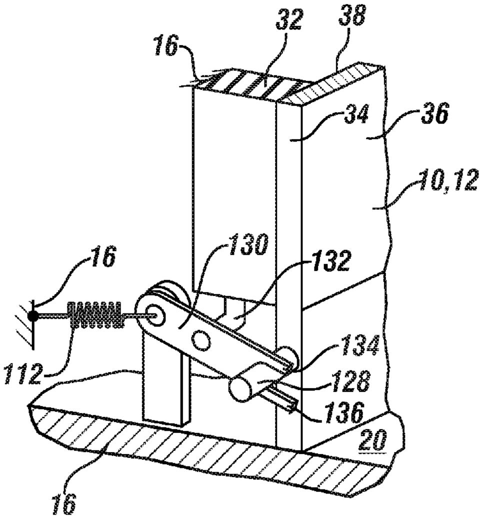
FIG. 27 is a schematic illustration of another latch movable between the locked and unlocked positions without utilizing an SMA actuator.

With regard to FIG. 27, the SMA actuator 100 can be eliminated and the latch 130 can be configured slightly differently from the latch 130 of FIGS. 24-26. In this embodiment, when the door 10 moves toward the open position, the latch 130 rotates and the seal 32 moves to the disengaged position, and when the door 10 moves to the closed position, the latch 130 rotates in the opposite direction and the seal 32 moves to the engaged position. The latch 130 includes a first arm 134 and a second arm 136 having different lengths. In certain embodiments, the second arm 136 is longer than the first arm 134, and the second arm 136 is disposed closer to the floor 20 than the first arm 134. As such, when the door 10 is closing, the extension 128 bypasses the first arm 134 and engages the second arm 136 to rotate the latch 130 back to the locked position. As the latch 130 rotates, the member 132 that extends from the latch 130 and is attached to the seal 32/cable 104, pushes the seal 32 to the disengaged position.

FIGS. 17-27 illustrate the seal 32 schematically and any of the configurations of the seal 32 are represented by these schematic illustrations. It is to be appreciated that the seal 32 can be configured as a block, similar to the schematic illustrations of FIGS. 17-27, if desired.

The SMA actuator 100 includes a smart material, which can be a shape memory alloy (SMA) material which is configured to be activated, i.e. to be in a first state, in response to the material having at least the first temperature such that activation of the SMA material activates the actuator 100. The SMA material is configured to be deactivated, i.e., to be in a second state, in response to the material having a sufficient number of degrees less than the first temperature such that the SMA material deactivates the actuator 100. More specifically, the SMA material exhibits a temperature hysteresis in its phase transformations. The magnitude of the hysteresis is typically between five degrees and forty degrees Celsius (C). The specific magnitude of the hysteresis in a particular application is a function of several parameters, including the material formulation of the SMA material and the stress state of the SMA material.

Shape memory alloys can exhibit a shape memory effect. That is, the SMA wire 106 can undergo a solid state, crystallographic phase change via a shift between a martensite phase, i.e., "martensite", and an austenite phase, i.e., "austenite." The martensite phase is a relatively soft and easily deformable phase of the shape memory alloys, which generally exists at lower temperatures. The austenite phase, the stronger phase of shape memory alloys, occurs at higher temperatures. The temperature at which a shape memory alloy remembers its high temperature form, referred to as the phase transformation temperature, can be adjusted by applying stress and other methods. Accordingly, a temperature difference between the austenite phase and the martensite phase can be the phase transformation delta T. Alternatively stated, the SMA wire 106 can undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable—i.e., Young's modulus is approximately 2.5 times lower—than the comparatively higher-temperature austenite phase.

The temperature at which the SMA wire 106 begins to change from the austenite phase to the martensite phase is known as the martensite start temperature, $M_s$. The temperature at which the SMA wire 106 completes the change from the austenite phase to the martensite phase is known as the martensite finish temperature, $M_f$. Similarly, as the SMA wire 106 is heated, the temperature at which the SMA wire 106 begins to change from the martensite phase to the austenite phase is known as the austenite start temperature, $A_s$. The temperature at which the SMA wire 106 completes the change from the martensite phase to the austenite phase is known as the austenite finish temperature, $A_f$.

Therefore, the SMA wire 106 can be in a cold state, i.e., when a temperature of the SMA member 132 is below the martensite finish temperature $M_f$ of the SMA wire 106. Simply stated, the SMA wire 106 can be cooled. Furthermore, the SMA wire 106 can also be in a hot state, i.e., when the temperature of the SMA wire 106 is above the austenite finish temperature $A_f$ of the SMA wire 106. Simply stated, the SMA wire 106 can be heated.

In operation, SMA material that is pre-strained or subjected to tensile stress can change dimension upon changing crystallographic phase to thereby convert thermal energy to mechanical energy. That is, the SMA material can change crystallographic phase from martensite to austenite and thereby dimensionally contract if pseudoplastically pre-strained so as to convert thermal energy to mechanical energy. Conversely, the SMA material can change crystallographic phase from austenite to martensite and if under stress thereby dimensionally expand.

"Pseudoplastically pre-strained" refers to stretching the SMA material while in the martensite phase so that the strain exhibited by the SMA material under that loading condition is not fully recovered when unloaded, where purely elastic strain would be fully recovered. In the case of SMA material, it is possible to load the material such that the elastic strain limit is surpassed and deformation takes place in the martensitic crystal structure of the material prior to exceeding the true plastic strain limit of the SMA material. Strain of this type, between those two limits, is pseudoplastic strain, called such because upon unloading it appears to have plastically deformed, but when heated to the point that the SMA material transforms to its austenite phase, that strain can be recovered, returning the SMA material to the original length observed prior to being subjected to any applied loading.

The SMA material can have any suitable composition. In particular, the SMA material can include an element selected from the group including cobalt, nickel, titanium, indium, manganese, iron, palladium, zinc, copper, silver, gold, cadmium, tin, silicon, platinum, gallium, and combinations thereof. For example, suitable SMA materials can include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The SMA material can be binary, ternary, or any higher order so long as the SMA material exhibits a shape memory effect, e.g., a change in shape orientation, damping capacity, and the like.

Returning to the embodiment of FIG. 17, the scissor type of seal 32 utilizes the SMA wire 106 to create the scissor movement. Therefore, heating the SMA wire 106 can cause the seal 32 to move to one of the engaged and disengaged positions. Furthermore, when cooling the SMA wire 106, the seal 32 moves to the other position. The SMA wires 106 can be fixed at the pivot points 98 (at least at the two extremities), wrapped up and around an outer pivot, and then down and around the following pivot on the opposite side (two mirrored wires—solid and dotted—are depicted in FIG. 17. As the SMA wire 106 transforms, the wire exerts a moment about the outer pivots which causes the mechanism to extend a distance, as the angle of the various links grows. Because of the kinematics of the linkage, the generated force, increases as the links become oriented more in-line with the output force, while the incremental stroke decreases. The geometry of the scissor mechanism dictates its performance, with the link length roughly controlling the displacement capability, the radius of the pivots setting the force capabilities, and the initial link angle, dictating the degree of leveraging.

The scissor design allows for units to be combined in parallel and series to provide a greater degree of actuator tailorability as well as the flexibility for providing point actuation (as shown in FIG. 17) or spatial actuation, where the surface formed by numerous scissor units would expand in one dimension while contracting in the other. SMA wires 106 can also be attached to the mechanism in various configurations in series and parallel, both mechanically and electrically, to aid in designing the actuator 100 for ease of assembly or for specific power requirements. The mechanism can also be implemented in an antagonistic configuration, with separate SMA wire 106 groups providing an expansive motion, and others providing a contractile operation. The SMA wires 106 do not slide around and over the pivots during actuation if the mechanism is symmetric, the arc circumscribed by the wire simply changes, which can assist in extending the life of the seal 32.

Figure 28:
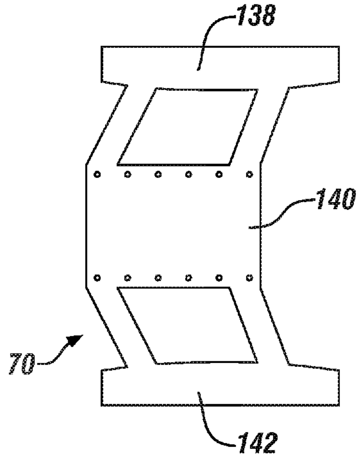
FIG. 28 is a schematic top view of an insert.
Figure 29:
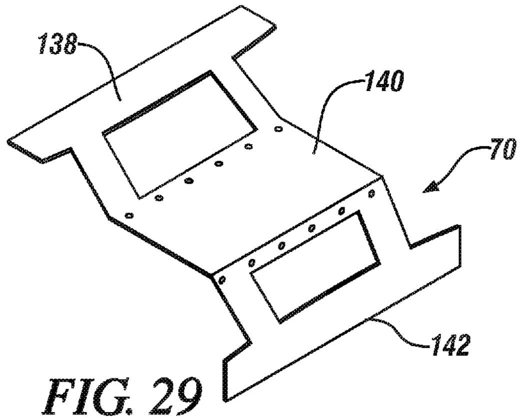
FIG. 29 is a schematic perspective view of the insert of FIG. 28 with a first wing bent relative to a top.
Figure 30:
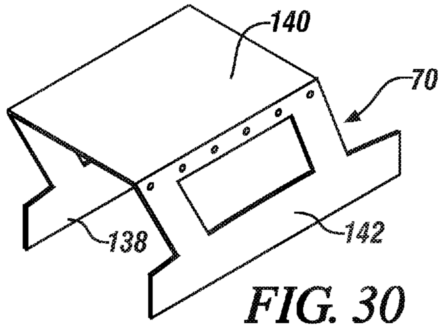
FIG. 30 is a schematic perspective view of the insert of FIG. 29 with a second wing bent relative to the top.

In addition to the above, a manufacturing process of the insert 70 is disclosed in FIGS. 28-30. The insert 70, which can be formed of metal, can be stamped into the general flat configuration of FIG. 28. Referring to FIG. 29, the insert 70 can include a first wing 138 which is folded relative to a central body 140. After the first wing 138 is folded, the insert 70 can include a second wing 142 which is folded relative to the central body 140 in the same direction as the first wing 138 such that the first and second wings 138, 142 are substantially parallel to each other. Then one of the bulbs 44, the fingers 82, 84, the lips, the flanges, etc., can be affixed to the central body 140 of the insert 70. The SMA actuator 100 can be coupled to the insert 70 by the central body 140, the first wing 138 and/or the second wing 142. The SMA actuator 100 causes the seal 32 to lean. It is to be appreciated depending on the length of the seal 32, the pattern illustrated in FIG. 28 can be repeated as many times as desired to achieve the desired length. This manufacturing process provides a quick and easy way to shape the insert 70. Once the insert 70 is in the desired configuration, the rubber material of the seal 32 can be formed over the insert 70.

One or more of the legs 54 discussed above can include the insert 70. The insert 70 disposed in the legs 54 can be any of the configurations discussed above, i.e., rectangular, circular, etc. For example, the insert 70 of FIGS. 28-30 can be folded such that part of the first and second wings 138, 142 create part of the first body 40, the spaced apart columns create part of the legs 54 and the central body 140 creates part of the second body 42. Even though not illustrated in FIGS. 28-30, the columns can define one or more indentation(s) complementary to the grooves 62 of the hinges 56 to assist in allowing movement of the legs 54 in the desired direction(s).

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A sealing assembly comprising:

a door including a flexible body that is movable between an open position and a closed position; and a seal movable between an engaged position in which the seal is positioned in engagement with a portion of the flexible body when the flexible body is in the closed position and a disengaged position in which the seal moves away from the portion of the flexible body as the flexible body moves from the closed position to the open position such that the flexible body is spaced from the seal to minimize frictional engagement with the seal;

wherein the seal includes a first body and a second body;

wherein the seal includes a plurality of legs disposed between the first and second bodies;

wherein each of the legs includes at least one hinge which assists in allowing movement of the legs relative to the first body;

wherein the at least one hinge defines a groove regardless of the position of the seal relative to the door, and wherein the groove is defined into each of the legs; each of the legs includes a first end and a second end spaced from each other; and each of the legs is linear between the first and second ends regardless of the position of the seal relative to the door.

2. The assembly as set forth in claim 1 wherein the first body is fixed to a support structure and the second body is spaced from the first body, with the second body engaging the portion of the flexible body when in the engaged position.

3. The assembly as set forth in claim 2 wherein the second body includes a bulb that engages the portion of the flexible body when in the engaged position.

4. The assembly as set forth in claim 3 wherein the bulb includes an outer surface and an inner surface, with the inner surface defining an aperture along a longitudinal axis, and the inner surface is circumferentially closed relative to the longitudinal axis.

5. The assembly as set forth in claim 4 wherein the at least one hinge is further defined as a plurality of hinges, with a respective one of the hinges connected to the first and second ends of each of the legs such that respective hinges connects the first end of respective legs to the first body and other respective hinges connects the second end of respective legs to the second body.

6. The assembly as set forth in claim 5 wherein the groove is further defined as a plurality of grooves spaced from each other, and respective grooves are defined into each of the first and second ends of each of the legs.

7. The assembly as set forth in claim 5 wherein the legs substantially align with each other and are spaced from each other in a row that is substantially parallel to the longitudinal axis.

8. The assembly as set forth in claim 5 wherein the legs are split into a first row of legs and a second row of legs that are spaced side-by-side each other, with the first row of legs substantially aligning with each other and spaced from each other substantially parallel to the longitudinal axis, and with the second row of legs substantially aligning with each other and spaced from each other substantially parallel to the longitudinal axis.

9. The assembly as set forth in claim 4 wherein the second body of the seal defines a hole spaced from the aperture, and wherein the seal includes an insert disposed in the hole, and further including a shape memory alloy actuator coupled to the insert to move the seal to at least one of the engaged and disengaged positions.

10. The assembly as set forth in claim 4 wherein the bulb includes at least one rib disposed in the aperture to split the aperture into a first aperture segment and a second aperture segment.

11. The assembly as set forth in claim 10 wherein the seal includes an insert disposed in the rib, and further including a shape memory alloy actuator coupled to the insert to move the seal to at least one of the engaged and disengaged positions.

12. The assembly as set forth in claim 10 wherein the rib is further defined as a plurality of ribs disposed in the aperture and spaced from each other to split the aperture into the first aperture segment, the second aperture segment and a third aperture segment.

13. The assembly as set forth in claim 10 wherein the bulb includes an insert disposed in the rib to support the bulb.

14. The assembly as set forth in claim 2 wherein the second body includes a center support, a first finger and a second finger, with the first and second fingers extending from the center support and wrapping back around toward the center support to define a first aperture segment and a second aperture segment which are circumferentially open to allow the first and second fingers to move back and forth.

15. The assembly as set forth in claim 2 wherein the second body includes an engagement surface that engages the portion of the flexible body when in the engaged position, and wherein the engagement surface defines a generally flat configuration.

16. The assembly as set forth in claim 1 further including a shape memory alloy actuator operatively coupled to the seal to move the seal to at least one of the engaged and disengaged positions.

17. The assembly as set forth in claim 1:

wherein the door is movably attached to a support structure that defines an opening, with the door covering the opening when in the closed position and at least partially uncovering the opening when in the open position;

wherein the door includes an extension;

further including a latch movable between a locked position engaging the extension and corresponding to the seal being in the engaged position, and an unlocked position disengaging from the extension and corresponding to the seal being in the disengaged position; and further including a shape memory alloy actuator coupled to the latch to move the latch to at least one of the locked and unlocked positions.

18. A sealing assembly comprising:

a support structure defining an opening;

a door including a flexible body that is movable between an open position and a closed position, with the door covering the opening when in the closed position and at least partially uncovering the opening when in the open position; and a seal including a first body fixed to the support structure and a second body spaced from the first body, with at least the second body movable between an engaged position in which the second body is positioned in engagement with a portion of the flexible body when the flexible body is in the closed position and a disengaged position in which the second body moves away from the portion of the flexible body as the flexible body moves from the closed position to the open position such that the flexible body is spaced from the seal to minimize frictional engagement with the seal;

wherein the seal includes a plurality of legs disposed between the first and second bodies;

wherein each of the legs includes a plurality of hinges spaced from each other;

wherein the hinges of each of the legs assist in allowing movement of the legs relative to the first body;

wherein each of the legs includes a first end and a second end spaced from each other;

wherein each of the legs is linear between the first and second ends regardless of the position of the seal relative to the door;

wherein one of the hinges is disposed at the first end of the respective one of the legs and another one of the hinges is disposed at the second end of the respective one of the legs such that each of the legs is linear between respective hinges.

19. A sealing assembly comprising:

a door including a flexible body that is movable between an open position and a closed position; and a seal movable between an engaged position in which the seal is positioned in engagement with a portion of the flexible body when the flexible body is in the closed position and a disengaged position in which the seal moves away from the portion of the flexible body as the flexible body moves from the closed position to the open position such that the flexible body is spaced from the seal to minimize frictional engagement with the seal;

wherein the seal includes a first body fixed to a support structure and a second body spaced from the first body, with the second body engaging the portion of the flexible body when in the engaged position;

wherein the second body includes a bulb that engages the portion of the flexible body when in the engaged position;

wherein the bulb includes an outer surface and an inner surface, with the inner surface defining an aperture along a longitudinal axis, and the inner surface is circumferentially closed relative to the longitudinal axis;

wherein the seal includes a plurality of legs disposed between the first and second bodies, and wherein each of the legs includes at least one hinge which assists in allowing movement of the legs relative to the first body;

wherein the at least one hinge is further defined as a plurality of hinges, with each of the legs including a first end and a second end spaced from each other, and a respective one of the hinges connected to the first and second ends of the legs such that respective hinges connects the first end of respective legs to the first body and other respective hinges connects the second end of respective legs to the second body;

wherein the legs are split into a first row of legs and a second row of legs that are spaced side-by-side each other, with the first row of legs substantially aligning with each other and spaced from each other substantially parallel to the longitudinal axis, and with the second row of legs substantially aligning with each other and spaced from each other substantially parallel to the longitudinal axis.

* * * * *